April 27, 1943.　　　　M. S. HARRIS　　　　2,317,606
AGRICULTURAL DEVICE
Filed July 22, 1942　　　　2 Sheets-Sheet 1
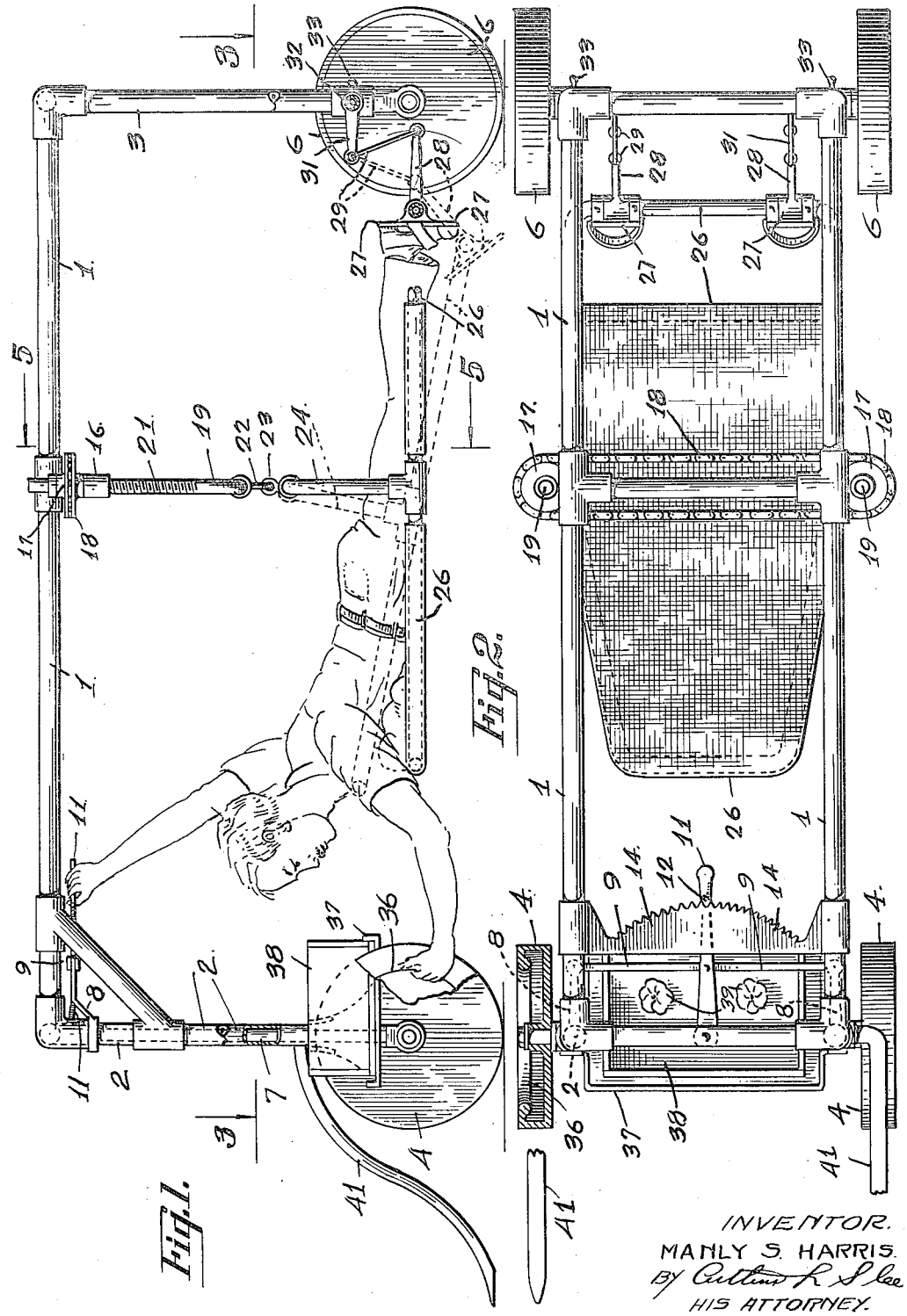
INVENTOR.
MANLY S. HARRIS.
BY Arthur L. Lee
HIS ATTORNEY.

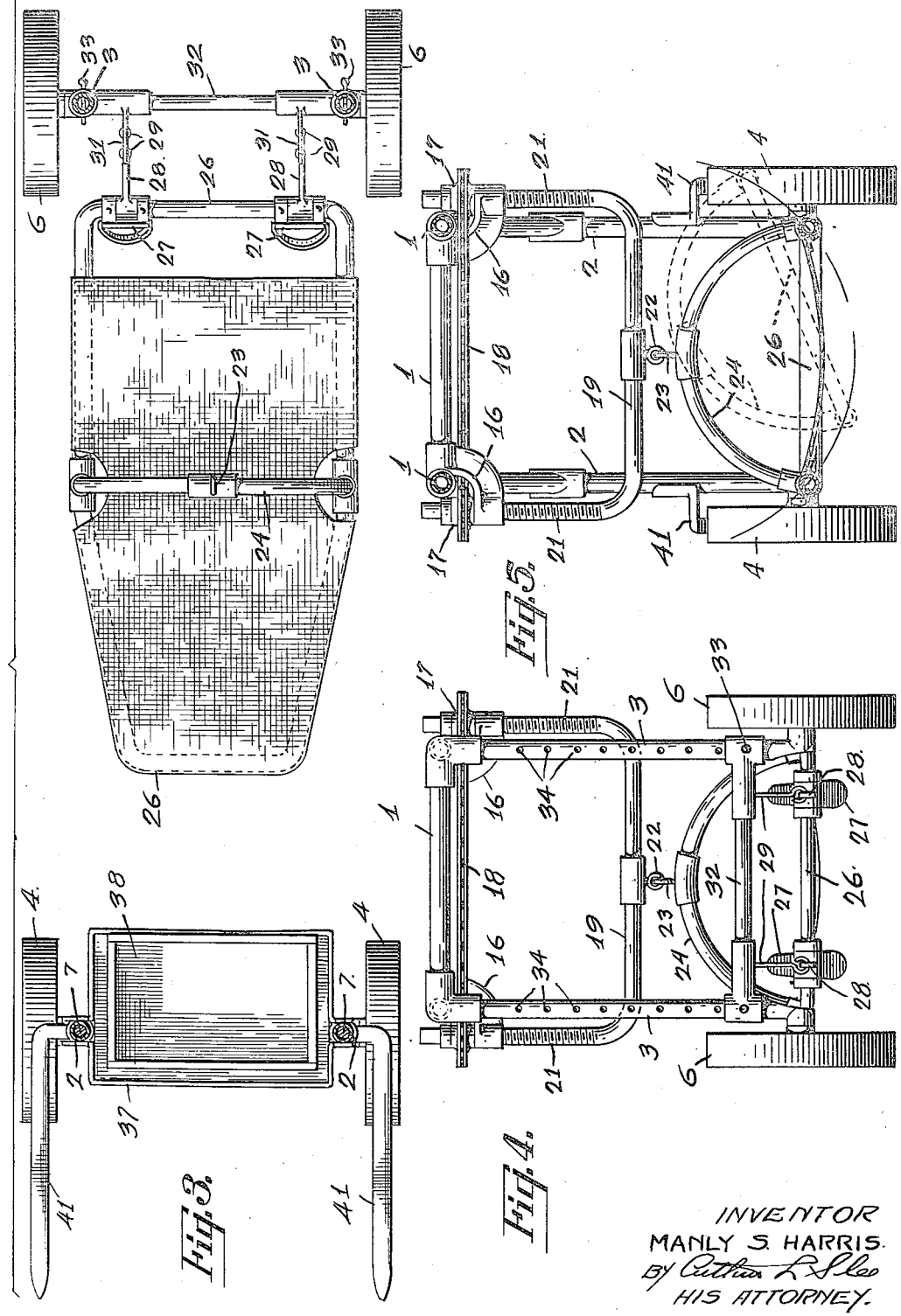

Patented Apr. 27, 1943

2,317,606

UNITED STATES PATENT OFFICE 2,317,606

AGRICULTURAL DEVICE

Manly S. Harris, San Francisco, Calif.

Application July 22, 1942, Serial No. 451,943

4 Claims. (Cl. 280—242)

My invention relates to improvements in an agricultural device for planting, cultivating and harvesting low-growing vegetation, wherein an arched frame, mounted upon wheels, operates in conjunction with a universally suspended cradle and means for raising and lowering said cradle to facilitate cultivation and harvesting of the tops or upper portions as well as the ground or lower portions of low-growing crops.

The primary object of the present invention is to provide new and improved means for eliminating the necessity for stooping in the planting, cultivating and harvesting of low vegetation whereby the fatigue and back-aches may be avoided and the efficiency and capacity of a worker may be greatly increased.

Another object is to provide a new and improved agricultural device of the character described for planting, cultivating and harvesting low-growing crops.

A further object is to provide a new and improved device of the type set forth for supporting a worker in a comfortable position at a low level in between or above rows of low-growing vegetation to increase accessibility of said low-growing plants, whereby the efficiency of a worker may be greatly increased.

I accomplish these and other objects by means of the improved device disclosed in the drawings forming a part of the present application, and in which—

Fig. 1 is a partly broken side elevation of the improvement disclosing an operator in working position thereon;

Fig. 2 is a plan view, partly in section;

Fig. 3 is a horizontal sectional view taken on line 3—3 of Fig. 1, in the direction indicated;

Fig. 4 is a rear elevation; and

Fig. 5 is a vertical transverse section taken on line 5—5 of Fig. 1, in the direction indicated.

Referring to the drawings:

The numeral 1 is used to designate in general an arched frame supported by front and rear corner-posts 2 and 3 and their wheels 4 and 6, respectively, the front pair of wheels 4 being connected to rods 7 rotatably mounted within said front posts 2 which rods have arms 8 connected by a reach-rod 9 to a central spring steering arm 11 pivotally mounted on the frame 1 and having a lug 12 to engage a notched segment 14 of the frame 1, by means of which said front wheels 4 may be steered or held to a set course, as disclosed in Fig. 2 of the drawings.

The approximate central portion of the frame 1 is provided with hangers 16 rotatably supporting internally threaded sprockets 17 connected by a chain 18 by means of which said sprockets 17 may be rotated in unison. The upper ends of an inverted U-shaped yoke 19 are threaded as at 21 to engage the internally threaded portions of the sprockets 17 so that rotation of said sprockets will raise or lower said yoke 19.

The lower end of the yoke 19 is provided with an eyelet or ring 22 from which is universally suspended a second ring or eyelet 23 in the top of an arched bar 24 of a cradle 26 for comfortably supporting an operator at a low level, as disclosed in Fig. 1 of the drawings.

The cradle 26 has a pair of independently pivotal pedals 27 on the rear end thereof, each pedal 27 being provided with an arm 28 the end of which is connected by a loose link 29 to an arm 31 on a cross-bar 32 slidably and vertically adjustable upon the rear posts 3 of the frame 1, said bar being held in any adjusted position by means of pins 33 engaging apertures 34 bored transversely through said rear posts 3.

As one form of propelling means, preferably the outer side of each front wheel 4 may be provided with an internal ring 36 which may be grasped and rotated by a prone operator on the cradle 26, as disclosed in Fig. 1 of the drawings. A suitable tray 37 may be adjustably and removably mounted upon the front posts 2 and in spaced relation to the front of the cradle 26 to support agricultural tools, not shown, or a lug-box 38 within which may be placed a crop 39 being harvested.

Curved guards 41 may be mounted upon the front posts 2, extending directly above and slanting downwardly and forwardly of the front wheels 4 to engage and raise low-hanging branches to render the same accessible to an operator.

In operation:

Instead of incurring the fatigue and back-ache of constant stooping between rows of low-growing vegetation, the operator comfortably lies prone upon the cradle 26 at a low elevation permitted by the universally suspended support, where he may plant, till, cultivate or harvest close to the ground without stooping.

In order to raise or lower his head and arms within certain limits without resorting to the operation of raising or lowering the entire cradle 26, an operator may with his feet depress the toe ends of the pedals 27 which, through the medium of the links 29 and cross bar 32 on the rear posts 3, will elevate the front end of the cradle 26 and tilt to the angle indicated in dotted lines, or longitudinally, in Fig. 1 of the drawings. Operating both pedals 27 in the opposite direction will then longitudinally tilt the cradle in an opposite direction. By operating the pedals 27 in opposite direction, the cradle 26 obviously will be tilted laterally or transversely as indicated in dotted lines in Fig. 5 of the drawings. This novel means for tilting the cradle longitudinally or transversely by a simple movement of the feet will readily increase the efficiency of the device as it will have the effect of enabling a prone operator to reach slightly higher or lower portions of the vegetation being worked, or to assume a position that will enable him to reach under branches or perform other operations without being held to a precise prone position.

Where an operator operates along or over the tops of rows, the arched frame straddles such rows, with the wheels 4 and 6 on either side, while the cradle 26 is elevated to clear such tops by means of the chain 18, which he moves to rotate the sprockets 17 and elevate the yoke 19 until the cradle 26 is universally suspended at the required height. In this new elevation, the crossbar 32 and tray 37 also may be moved to operate in conjunction with said cradle.

When the operator desires to advance or retreat to a new position, he grasps the internal rings or rims 36 of the front wheels 4 and rotates them to propel the device. To steer or change direction, he springs the lever 11 to clear the lug 12 from the notched segment 14 and turns the front wheels 4 to the required angle.

Having described my invention, I claim—

1. An agricultural device comprising an arched frame; wheels for supporting said frame; a cradle universally suspended from the arch of said frame; means connected to said frame and cradle for longitudinally and transversely tilting said cradle; and means for raising and lowering said cradle relatively to said frame.

2. An agricultural device comprising an arched frame; two pairs of wheels mounted on said frame; a cradle universally suspended from said frame; pedals pivotally mounted upon said cradle and operatively connected to said frame to longitudinally and transversely tilt said cradle; and a tray mounted on the frame.

3. An agricultural device comprising an arched frame; two pairs of wheels mounted on said frame; a cradle universally suspended within the arch of said frame; pedals pivotally mounted on one end of said cradle and operatively connected to said frame to longitudinally and transversely tilt said cradle; and steering means mounted on said frame and connected to one pair of wheels.

4. An agricultural device comprising an arched frame; two pairs of wheels mounted on said frame; a cradle universally suspended within the arch of said frame; pedals pivotally mounted on one end of said cradle and operatively connected to said frame to longitudinally and transversely tilt said cradle; and means for raising and lowering said cradle within said arch.

MANLY S. HARRIS.